May 7, 1963  G. D. SMITH  3,088,918
LATHER MAKING APPARATUS
Filed March 28, 1960  3 Sheets-Sheet 1

INVENTOR.
GERALD D. SMITH
BY
Lockwood, Woodard, Smith, + Weikart
ATTORNEYS

May 7, 1963 G. D. SMITH 3,088,918
LATHER MAKING APPARATUS
Filed March 28, 1960 3 Sheets-Sheet 2

INVENTOR.
GERALD D. SMITH
BY
Lockwood, Woodard, Smith, & Weikart
ATTORNEYS

May 7, 1963  G. D. SMITH  3,088,918
LATHER MAKING APPARATUS
Filed March 28, 1960  3 Sheets-Sheet 3

*INVENTOR.*
GERALD D. SMITH
BY
*Lockwood, Woodard, Smith, + Weikart*
ATTORNEYS

United States Patent Office 3,088,918
Patented May 7, 1963

3,088,918
LATHER MAKING APPARATUS
Gerald D. Smith, 6207 Breamore Road, Indianapolis, Ind.
Filed Mar. 28, 1960, Ser. No. 18,149
14 Claims. (Cl. 252—359)

This invention relates generally to lather making apparatus and in particular to an apparatus of this type which has a higher efficiency than prior art devices, has relatively few parts, and can be manufactured at relatively low cost.

The apparatus of the present invention may be used, for example, in barbershops for dispensing lather. It may also find use in homes as a lather dispenser for children, or as a shampoo or cosmetic dispenser. Prior art devices of this type conventionally use an electric motor driven rotary brush or beater for beating air into a soap compound. These devices have been relatively costly to manufacture because of, among other things, the use of a rotary type electric motor for actuating the beater.

A further difficulty encountered in prior art devices is the tendency for the lather dispensing aperture and the soap inlet passage to the areating or lather forming chamber to become clogged with dried soap necessitating frequent disassembly and cleaning. The design of the areating chamber and the beater accommodated therein is a factor of primary importance in providing a satisfactory lather making device in that the action of the agitator or beater must create a pressure differential between the air and soap intake passages to the lather chamber and the lather exit or dispensing passage.

It is an object of the present invention to provide an air emulsion making apparatus utilizing a simple electric vibrator for providing a reciprocating, angular motion to the beater, the cooperation of the beater and the emulsion forming chamber being such as to provide positive intake of air and the ingredient to be mixed therewith into the chamber and to provide the required discharge pressure at the emulsion dispensing aperture.

A further object of the present invention is to provide a lather or emulsion forming apparatus of the type referred to utilizing an angularly reciprocable beater which is apertured to provide maximum aeration of the material admitted to the lather chamber.

A further object of the present invention is to provide an apparatus of the type referred to in which the side walls of the lather chamber are provided with a resilient, open-celled and therefore absorbent material to slow the migration of soap from the soap inlet aperture toward the lather exit aperture thereby insuring that the soap is properly aerated prior to its passage through the exit aperture.

A further object of the present invention is to provide an apparatus of the type referred to which is self-cleaning.

A further object of the present invention is to provide an apparatus of the type required wherein the valve for admitting liquid soap to the lather chamber is adjustable to provide lather of the desired wetness or soap to air proportion and to accommodate liquid soaps of various viscosities.

A further object of the present invention is to provide an apparatus of the type referred to which is relatively quiet in operation.

A further object of the present invention is to provide an apparatus which is of simplified, trouble-free construction characterized by the absence of motor bearings and brushes which normally require replacement, the apparatus thus having a prolonged service life.

A further object of the present invention is to provide an apparatus of the type referred to in which the soap feed to the lather chamber occurs automatically with the beater motion, a single hand operation, energizing the beater driving vibrator, being the sole manipulation required to produce lather at the lather exit or dispensing aperture.

A further object of the present invention is to provide an apparatus of the type referred to which is characterized by a high lather producing efficiency.

The full nature of the invention will be understood from the accompanying drawings and the following description and claims:

Figures 1, 6:
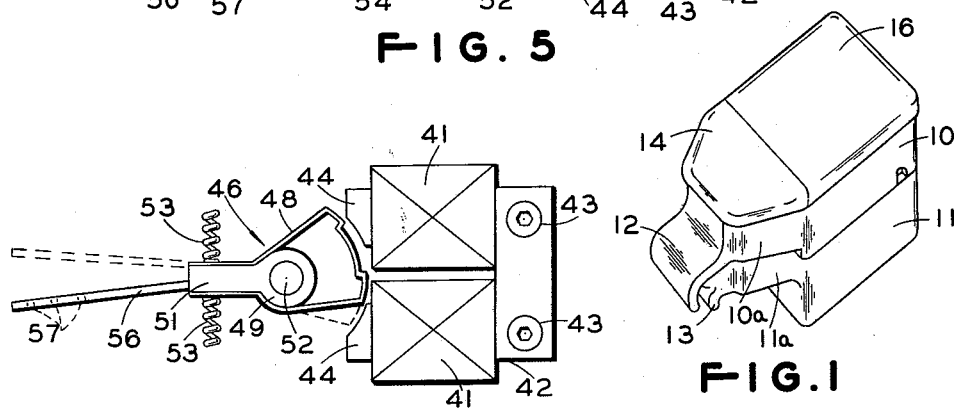
FIG. 1 is a perspective view of the present invention.
FIG. 6 is a bottom plan view of the vibrator and agitator blade assembly.
Figure 2:
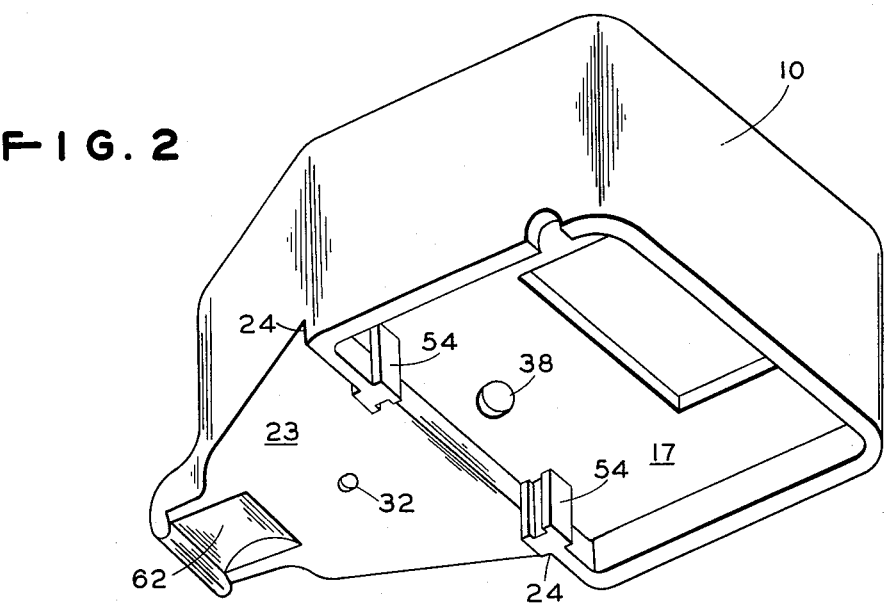
FIG. 2 is a perspective view of the upper setcion of the housing shown in FIG. 1, the perspective view being taken from an angle showing the base portion of the upper section.

Referring initially to FIG. 1, the assembled apparatus comprises a housing composed of an upper housing section 10 and a lower housing section 11. The housing sections are generally dished or box-shaped in configuration and both have extending portions 10a and 11a respectively at adjacent ends. The upper section has a lip portion 12 which extends in overlying spaced relation to a corresponding lip portion 13 of the lower housing section. The upper face of the upper housing section 10 is closed by a two-piece snap-on lid, the front section 14 being removable for access to the soap reservoir to be subsequently described and the lid section 16 being removable for maintenance access to the drive unit for the agitator blade to be subsequently described. The housing sections may be formed of any suitable material, such as Tenite or the like.

Referring to FIGS. 2–5, the upper housing section 10 is provided with a transverse member 17, the member 17 being provided with an enlarged, rectangular aperture 18. A vertically extending ridge or boss 19 extends across the housing section. A vertically extending partition 21 cooperates with the adjacent end and side walls of the housing section to provide a liquid soap accommodating cavity 22, a base member 23 closing the lower end of the cavity. The base member 23 is disposed slightly above the lower margin of the major portion of the side walls of the upper housing section to provide a step or notch 24 which accommodates a corresponding raised portion of the lower housing section as will subsequently be described.

Figure 3:
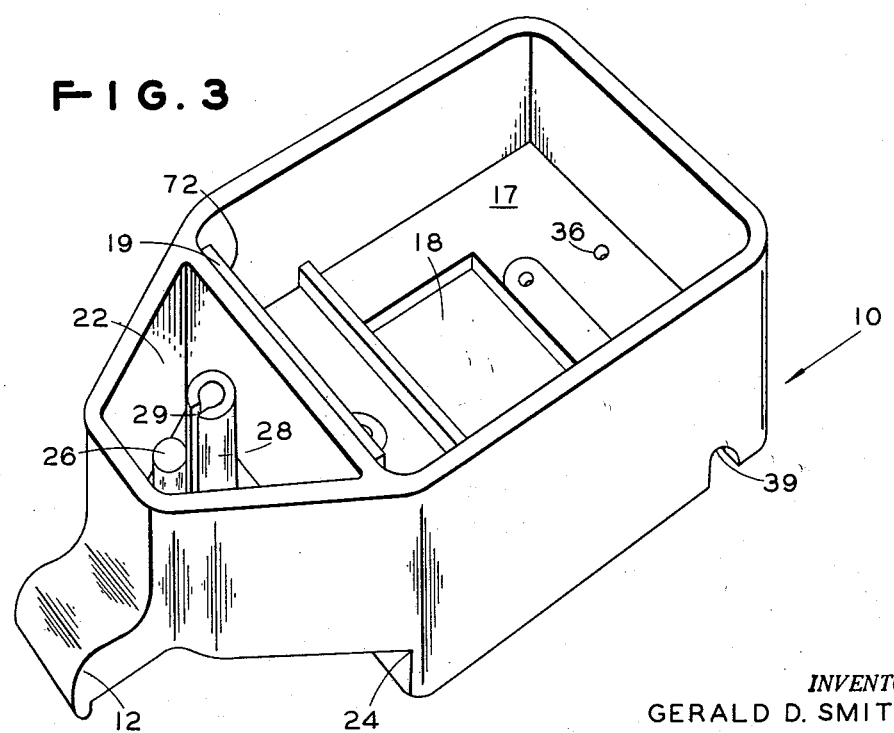
FIG. 3 is a further perspective view of the upper housing section shown in FIG. 2, but taken from an angle which displays the upper face of the section.

The base member 23 is provided with spaced bosses 26 which accommodate threaded brass inserts 27 adapted to receive screws extending through the appropriate portion of the lower housing section to be subsequently described. Extending upwardly within the reservoir 22 is a tubular member 28 having a longitudinal slot 29 (FIG. 3). The member 28 extends above the liquid soap level within the reservoir (indicated at 30 in FIG. 5) and encloses a compression spring 31. The lower end of the compression spring bears against a ball closure 32 which is seated within a beveled aperture 33 in the base member 23. The closure 32 and the aperture 33 are relatively sized so that a portion of the ball closure extends into the area below the base member 23. The upper portion of the member 28 may be internally threaded to receive an adjusting member 34 upon which the upper end of the spring 31 abuts. Adjustment of the vertical position of the member 34 thus adjusts the desired biasing force of the spring upon the ball closure. The member 17 is provided with an aperture 36 which accommodates a screw (not shown) for securing the upper housing section and lower housing section in assembled relation. The member 17 is further provided with inserts 37 and 38 which receive vibrator mounting screws and the agitator blade pivot pin as will subsequently be described. A semi-circular aperture 39 in the upper housing section side wall permits entry of suitable electric wiring into the housing.

The agitator blade and its actuating vibrator will now be described in detail with reference to FIGS. 5 and 6. The vibrator assembly itself is of a conventional type and includes coils 41 lined by a laminated magnetically permeable structure 42. Mounting screws 43 extending into the insert 37 serve to suspend the vibrator structure from the under face of the member 17. The structure 42 provides pole pieces 44 which cooperate with an appropriately shaped armature 46.

The armature is formed of a relatively thin metal band 48 which extends in embracing relation with the circular portion 49 and an integral shank portion 51 of a block formed of nylon or similar material. A pivot pin 52 extends through the central bore of the circular portion 49 and through the insert 38 (FIG. 5). The circular portion 49 of the nylon block freely accommodates the pin 52 so that the armature assembly may be pivotally moved thereabout. Opposed compression springs 53 engages the shank portion of the nylon block and are bottomed against suitably formed spring retaining members 54 which extend inwardly from the upper housing section side walls as may best be seen in FIG. 4. Extending from the nylon block is a relatively thin, generally rectangular-shaped agitator blade 56. The agitator blade is preferably formed of nylon and may be integral with the shank portion 51 of the nylon block. As may best be seen in FIG. 6, the blade 56 etxends angularly from the shank portion 51 and is provided with a series of spaced apertures 57.

Figure 5:
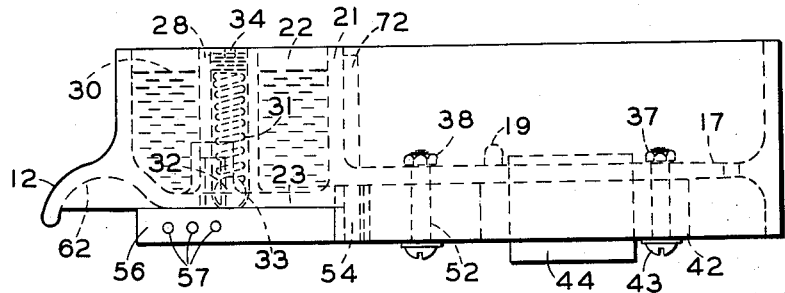
FIG. 5 is a side view of the upper housing section showing the vibrator and agitator blade in place therein.

As may best be seen in FIG. 5, when the agitator blade and vibrator assembly are installed within the upper housing section, the blade 56 extends closely beneath the base member 23 and the aperture 18 in the member 17 accommodates the upper portion of the vibrator coils 44. It will be understood that with the vibrator energized by sixty cycle alternating current power, the armature 46 and consequently the agitator blade 56 will be pivotally or angularly reciprocated, as indicated by broken lines in FIG. 6. In moving through its stroke the upper margin of the blade 56 will engage the ball closure 32, moving it from its seat to admit liquid soap into the area through which the blade moves.

Figure 7:
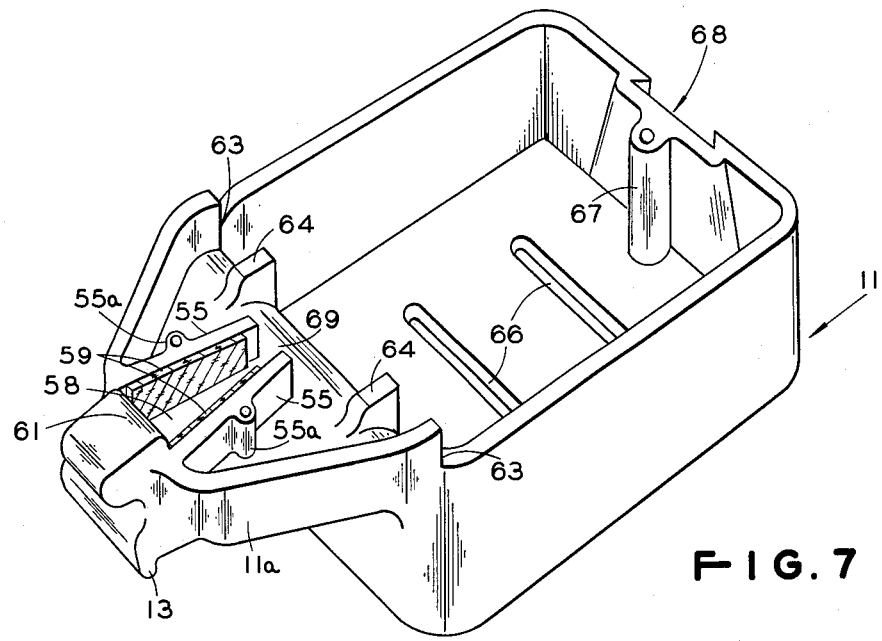
FIG. 7 is a perspective view of the lower housing section.

The lower housing section providing the lather cavity will now be described with reference to FIGS. 7 and 8. The lower housing section 11 is generally dished or box-shaped and the upwardly offset portion 11a is provided with two inwardly converging wall members 55. The wall members 55 provide a wedge-shaped lather cavity 58, the wide end of the cavity terminating at the adjacent side wall of the portion 11a of the lower housing section. Secured by any suitable adhesive or the like to the faces of the wall members 55 are opposed strips 59 formed of a suitable open-celled spongy material. At the end of the cavity 58 there is provided a lip 61 which extends above the upper margin of the wall members 55 and presents a convex surface to the concave surface 62 (FIG. 5) formed on the tab 12. Integral bosses 55a are formed adjacent the wall members 55 and receive mounting screws which extend upwardly through the bosses and are threaded into the inserts 27 appropriately positioned within the upper housing section.

Figure 4:
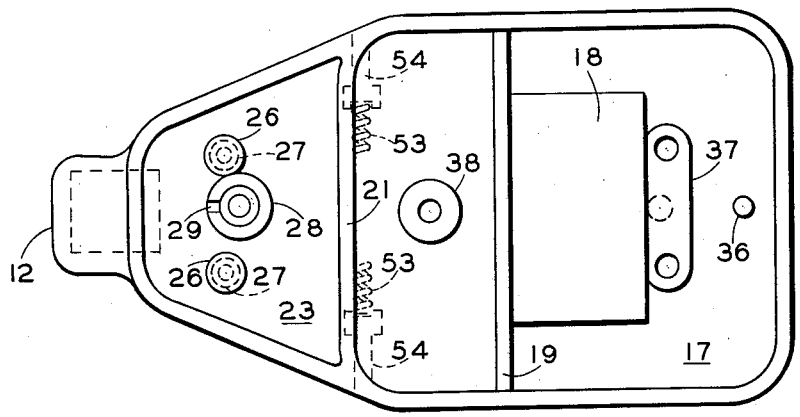
FIG. 4 is a top plan view of the upper housing section.
Figure 9:
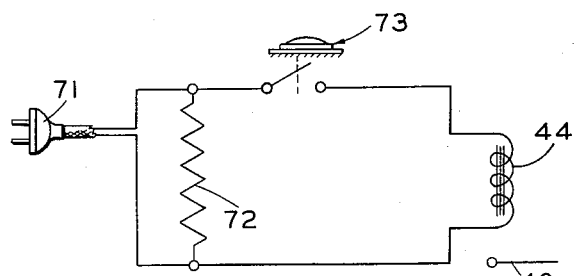
FIG. 9 is a schematic illustration of the wiring circuit for the apparatus.

The transition between the offset section 11a and the main portion of the lower housing section is marked by notches 63 which mate with the notches 24 in the upper housing section 10 when the two housing sections are disposed in assembled relation. Vertically extending bosses 64 engage the lower ends of the spring retaining members 54 which are carried by the upper housing section. Slots 66 in the base of the lower housing section permit free entry of air into the housing. An apertured boss 67 accommodates a screw or other fastening member (not shown) which may extend through the aperture 36 in the upper housing section for locking the two housing sections in assembled relation. The rear wall of the lower housing section is formed to provide an external slot 68 which is adapted to cooperate with a conventional wall hanging bracket. With the upper and lower housing sections in assembled relation, it will be evident that the agitator blade 56 extends through the open end 69 of the cavity 58 and, when actuated, sweeps across the cavity. The electrical circuit is shown in FIG. 9 wherein the input plug 71 has connected thereacross an electric heater 72. The heater may be of any suitable type, such as a properly insulated wire-wound element 72. The heater 72 is suitably mounted, as indicated in FIGS. 3–5, closely adjacent the wall 21 of the soap reservoir. A separate manually operable switch (not shown) may be provided if desired for independently controlling the heater 72. Its function is to maintain the liquid soap or other material in the reservoir at a temperature such as to provide hot lather. Connected in series-parallel relation with the heater are a push button switch 73 and the vibrator coils 44. If the apparatus is to be used to produce a lather or air-emulsion which need not be heated, the heater 72 may be omitted from the assembly.

Figure 8:
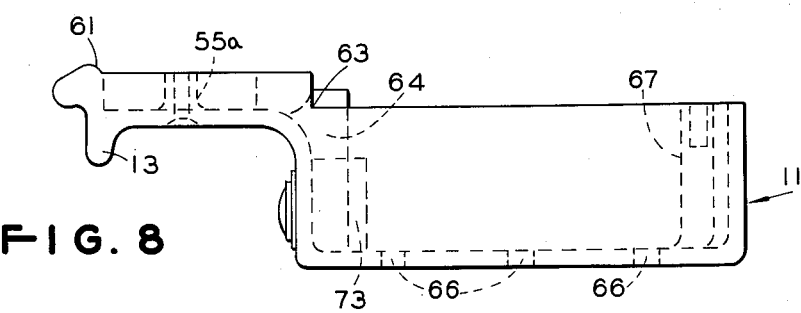
FIG. 8 is a side view of the lower housing section.

The switch 73 is of a conventional enclosed type and is shown mounted in the assembly in FIG. 8. The push button actuator for the switch extends outside the housing and is disposed beneath and to the rear of the lip portion 13. The arrangement is such that with the operator's hand inserted palm up beneath the tabs 12 and 13 for reception of lather, the tips of the operator's fingers will actuate the switch 73 to closed position.

Figure 10:
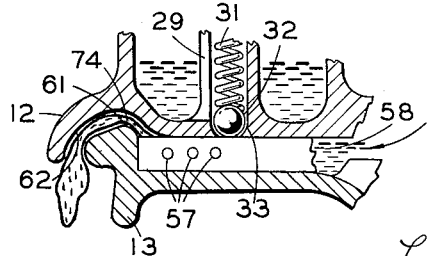
FIG. 10 is a fragmentary side sectional view illustrating the operation of the apparatus.

Referring to FIG. 10, the operation of the apparatus will now be described. With the opertator's hand positioned beneath the tabs 12 and 13, as mentioned above, so as to actuate the switch 73, the vibrator will be energized and will angularly reciprocate the agitator blade 56. As the blade moves through its stroke, it will displace the ball closure 32, permitting a small amount of liquid soap to enter the cavity 58 on each stroke of the blade. The movement of the blade is such as to draw air into the cavity through the open end thereof, as indicated by arrow in FIG. 10. The liquid soap admitted through the aperture 33 is aerated by the action of the agitator blade. The spongy members 59 (FIG. 7) lining the cavity side walls serve to deaden the sound created by the agitator blade, and also serve to slow the progress of the liquid soap through the chamber so that when the soap arrives at the area 74 it will be properly aerated and the lather will be of the desired consistency. The pressure created at the area 74 is such as to cause the lather to flow over the lip 61 and out through the space between the concave surface 62 and the lip.

It will be noted that the slot 29 in the member 28 permits entry of the soap into the area adjacent the ball closure. By adjusting the biasing force of spring 31, the wetness characteristic of the lather may be varied. This adjustment also permits the accommodation of liquid soap of various types, that is, soaps of various viscosities. The apertures 57 in the agitator blade provide additional beating edges to greatly increase the effectiveness of the beating action. The simple vibrator actuation of the agitator blade eliminates replacement of motor brushes and bearings as is necessary in conventional rotary motor electric driven structures. The lather producing efficiency is quite high and the soap reservoir needs to be replenished only at widely spaced intervals even when the apparatus is subject to heavy usage. The agitator blade action is such as to produce a positive flow of air through the lather cavity so that the lather cavity and the adjacent lather exit space is self cleaned, that is, the air passing through the cavity blows out any dried soap which may accumulate at the lather exit area.

The preferred embodiment of the invention has been described herein as providing a hot air-soap emulsion or hot lather such as is used in barber shops or in homes. It is to be understood, however, that the apparatus might be utilized to provide an air emulsion of any suitable fluid other than soap either at room temperature or in heated condition, such emulsions finding use, for example, as shampoo, cosmetic or medicinal preparations. The scope of the present invention is intended to include such uses and variations in the emulsion ingredients.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. A lather making apparatus comprising a two-piece housing having an upper section adapted to be secured in overlying relation to a lower section, two inwardly converging wall members disposed at one end of said lower housing section to provide an open-ended wedge-shaped lather cavity, the wide end of said cavity terminating at the adjacent side wall of said lower housing section, a lip on said lower housing section side wall adjacent said cavity and extending above the level of said cavity wall members, an agitator blade pivotally supported within said upper housing section and positioned so as to extend into said cavity through the open end thereof when said housing sections are secured in assembled relation, means carried by said upper housing section providing a liquid soap reservoir directly above said cavity, said last mentioned means including a transverse base member forming an upper wall for said cavity and a base wall for said reservoir, soap metering means including an aperture in said base member, a ball closure for said aperture spring biased into engagement with said base member, the relative sizes of said aperture and said ball closure being such that a portion of the ball closure extends into said cavity, said upper housing section having an outwardly extending tab provided a concave surface overlying and spaced from said lip, and an electric vibrator supported within said upper housing section adapted when energized to angularly reciprocate said agitator blade within said cavity whereby engagement of said ball closure by said blade admits liquid soap into said cavity, the motion of said blade serving to draw air into said cavity through its open end and to provide a positive pressure for ejecting lather through the space between said lip and said concave tab surface.

2. A lather making apparatus as claimed in claim 1 in which said agitator blade is provided with spaced apertures along its length to provide improved aerating or beating action.

3. A lather making apparatus as claimed in claim 1 in which said cavity wall members are provided with a covering of sponge like material engaged by said agitator blade at the limits of its stroke.

4. A lather making apparatus as claimed in claim 1 in which the spring bias for said ball closure is adjustable to vary the rate of admission of liquid soap of a given viscosity into said lather cavity.

5. A lather making apparatus as claimed in claim 1 having electric heating means disposed adjacent said soap reservoir for maintaining the temperature and hence the viscosity of the reservoir contents at a level determined by heating capacity of said heating means.

6. A lather making apparatus as claimed in claim 1 having a push-button switch controlling energization of said vibrator, said switch being mounted within said lower housing section with its push button extending exteriorly thereof and rearwardly of said lip.

7. A lather making apparatus comprising a two-piece housing having an upper section adapted to be secured in overlying relation to a lower section, two inwardly converging wall members disposed at one end of said lower housing section to provide an open-ended wedge-shaped lather cavity, the wide end of said cavity terminating at the adjacent side wall of said lower housing section, a lip on said lower housing section side wall adjacent said cavity and extending above the level of said cavity wall members, an agitator blade pivotally supported within said housing and positioned so as to extend into said cavity through the open end thereof when said housing sections are secured in assembled relation, means carried by said upper housing section providing a liquid soap reservoir directly above said cavity, said last mentioned means including a transverse base member forming an upper wall for said cavity and a base wall for said reservoir, soap metering means in said base member for admitting soap from said reservoir into said cavity, said metering means comprising a normally closed valve actuated to open position upon motion of said agitator blade, said upper housing section having an outwardly extending tab providing a concave surface overlying and spaced from said lip, and an electric vibrator supported within said housing adapted when energized to angularly reciprocate said agitator blade within said cavity whereby the motion of said blade serves to draw air into said cavity through its open end and to provide a positive pressure for ejecting lather through the space between said lip and said concave tab surface.

8. A lather making apparatus comprising a two-piece housing having an upper section adapted to be secured in overlying relation to a lower section, two inwardly converging wall members disposed at one end of said lower housing section to provide an open-ended wedge-shaped lather cavity, the wide end of said cavity terminating at the adjacent side wall of said lower housing section, a lip on said lower housing section side wall adjacent said cavity and extending above the level of said cavity wall members, an agitator blade pivotally supported within said housing and positioned so as to extend into said cavity through the open end thereof when said housing sections are secured in assembled relation, means carried by said upper housing section providing a liquid soap reservoir, soap metering means for admitting soap from said reservoir into said cavity, said metering means comprising a normally closed valve actuated to open position upon motion of said agitator blade, said upper housing section having an outwardly extending tab overlying and spaced from said lip, and an electric vibrator supported within said housing adapted when energized to angularly reciprocate said agitator blade within said cavity whereby the motion of said blade serves to draw air into said cavity through its open end and to provide a positive pressure for ejecting lather through the space between said lip and said tab.

9. A lather making apparatus comprising a two-piece housing having an upper section adapted to be secured in overlying relation to a lower section, two inwardly converging wall members disposed at one end of said lower housing section to provide an open-ended wedge-shaped lather cavity, the wide end of said cavity terminating at the adjacent side wall of said lower housing section, a lip on said lower housing section side wall adjacent said cavity and extending above the level of said cavity wall members, an agitator blade pivotally supported within said housing and positioned so as to extend into said cavity through the open end thereof when said housing sections are secured in assembled relation, means carried by said upper housing section providing a liquid soap reservoir, soap metering means for admitting soap from said reservoir into said cavity, said metering means comprising a normally closed valve actuated to open position upon motion of said agitator blade, said upper housing section having an outwardly extending tab overlying and spaced from said lip, and electric actuating means supported within said housing adapted when energized to angularly reciprocate said agitator blade within said cavity whereby the motion of said blade serves to draw air into said cavity through its open end and to provide a positive pressure for ejecting lather through the space between said lip and said tab.

10. A lather making apparatus comprising a housing, two inwardly converging wall members disposed at one end of said housing to provide an open-ended wedge-shaped cavity, the wide end of said cavity terminating at the adjacent side wall of said housing, a lather dispensing aperture in said housing at the wide end of said cavity, an agitator blade pivotally supported within said housing and positioned so as to extend into said cavity through the open end thereof, means within said housing providing a reservoir for liquid to be aerated, metering means for admitting liquid from said reservoir into said cavity, said metering means comprising a normally closed valve actuated to open position upon motion of said agitator blade, and an electric actuating means supported within said housing adapted when energized to angularly reciprocate said agitator blade within said cavity whereby the motion of said blade serves to draw air into said cavity through its open end and to provide a positive pressure for ejecting lather through said lather dispensing aperture.

11. An air-emulsion forming apparatus comprising a two-piece housing having an upper section adapted to be secured in overlying relation to a lower section, two inwardly converging wall members disposed at one end of said lower housing section to provide an open-ended wedge-shaped lather cavity, the wide end of said cavity terminating at the adjacent side wall of said lower housing section, a lip on said lower housing section side wall adjacent said cavity and extending above the level of said cavity wall members, an agitator blade pivotally supported within said housing and positioned so as to extend into said cavity through the open end thereof when said housing sections are secured in assembled relation, means carried by said upper housing section providing an emulsion forming liquid ingredient reservoir directly above said cavity, said last mentioned means including a transverse base member forming an upper wall for said cavity and a base wall for said reservoir, metering means in said base member for admitting said ingredient from said reservoir into said cavity, said metering means comprising a normally closed valve actuated to open position upon motion of said agitator blade, said upper housing section having an outwardly extending tab providing a concave surface overlying and spaced from said lip, and an electric vibrator supported within said housing adapted when energized to angularly reciprocate said agitator blade within said cavity whereby the motion of said blade serves to draw air into said cavity through its open end and to provide a positive pressure for ejecting emulsion through the space between said lip and said concave tab surface.

12. An air-emulsion forming apparatus comprising a two-piece housing having an upper section adapted to be secured in overlying relation to a lower section, two inwardly converging members disposed at one end of said lower housing section to provide an open-end wedge-shaped lather cavity, the wide end of said cavity terminating at the adjacent side wall of said lower housing section, a lip on said lower housing section side wall adjacent said cavity and extending above the level of said cavity wall members, an agitator blade pivotally supported within said housing and positioned so as to extend into said cavity through the open end thereof when said housing sections are secured in assembled relation, means carried by said upper housing section providing an emulsion forming ingredient reservoir, liquid ingredient metering means for admitting said emulsion forming ingredient from said reservoir into said cavity, said metering means comprising a normally closed valve actuated to open position upon motion of said agitator blade, said upper housing section having an outwardly extending tab overlying and spaced from said lip, and an electric vibrator supported within said housing adapted when energized to angularly reciprocate said agitator blade within said cavity whereby the motion of said blade serves to draw air into said cavity through its open end and to provide a positive pressure for ejecting emulsion through the space between said lip and said tab.

13. An air-emulsion forming apparatus comprising a two-piece housing having an upper section adapted to be secured in overlying relation to a lower section, two inwardly converging wall members disposed at one end of said lower housing section to provide an open-ended wedge-shaped lather cavity, the wide end of said cavity terminating at the adjacent side wall of said lower housing section, a lip on said lower housing section side wall adjacent said cavity and extending above the level of said cavity wall members, an agitator blade pivotally supported within said housing and positioned so as to extend into said cavity through the open end thereof when said housing sections are secured in assembled relation, means carried by said upper housing section providing an emulsion forming liquid ingredient reservoir, metering means for admitting an emulsion forming ingredient from said reservoir into said cavity, said metering means comprising a normally closed valve actuated to an open position upon motion of said agitator blade, said upper housing section having an outwardly extending tab overlying and spaced from said lip, and electric actuating means supported within said housing adapted when energized to angularly reciprocate said agitator blade within said cavity whereby the motion of said blade serves to draw air into said cavity through its open end and to provide a positive pressure for ejecting emulsion through the space between said lip and said tab.

14. An air-emulsion forming apparatus comprising a housing, two inwardly converging wall members disposed at one end of said housing to provide an open-ended wedge-shaped lather cavity, the wide end of said cavity terminating at the adjacent side wall of said housing, an emulsion dispensing aperture in said housing at the wide end of said cavity, an agitator blade pivotally supported within said housing and positioned so as to extend into said cavity through the open end thereof, means within said housing providing a reservoir for a liquid ingredient to be aerated, metering means for admitting said ingredient from said reservoir into said cavity, said metering means comprising a normally closed valve actuated to open position upon motion of said agitator blade, and an electric actuating means supported within said housing adapted when energized to angularly reciprocate said agitator blade within said cavity whereby the motion of said blade serves to draw air into said cavity through its open end and to provide a positive pressure for ejecting emulsion through said dispensing aperture.

References Cited in the file of this patent
UNITED STATES PATENTS

| | | |
|---|---|---|
| 1,537,552 | Rotunno | May 12, 1925 |
| 2,256,694 | Tuttle | Sept. 23, 1941 |
| 2,319,244 | Cascio et al. | May 18, 1943 |
| 2,925,202 | Stevens | Feb. 16, 1960 |